(12) United States Patent
Miyagawa

(10) Patent No.: US 9,776,564 B2
(45) Date of Patent: Oct. 3, 2017

(54) VEHICLE PERIPHERY MONITORING DEVICE

(71) Applicant: HONDA MOTOR CO., LTD., Minato-Ku, Tokyo (JP)

(72) Inventor: Keisuke Miyagawa, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 14/654,591

(22) PCT Filed: Sep. 4, 2013

(86) PCT No.: PCT/JP2013/073830
§ 371 (c)(1),
(2) Date: Jun. 22, 2015

(87) PCT Pub. No.: WO2014/103433
PCT Pub. Date: Jul. 3, 2014

(65) Prior Publication Data
US 2015/0343948 A1 Dec. 3, 2015

(30) Foreign Application Priority Data

Dec. 25, 2012 (JP) .................................. 2012-280938

(51) Int. Cl.
*B60Q 9/00* (2006.01)
*H04N 7/18* (2006.01)
(Continued)

(52) U.S. Cl.
CPC ......... *B60Q 9/008* (2013.01); *G06K 9/00369* (2013.01); *G06K 9/00805* (2013.01);
(Continued)

(58) Field of Classification Search
CPC .. H04N 7/18; G06K 9/00369; G06K 9/00805; G08G 1/166; B60Q 9/008
See application file for complete search history.

(56) References Cited

U.S. PATENT DOCUMENTS

| 8,184,159 | B2 * | 5/2012 | Luo .................. | G06K 9/00798 348/148 |
| 8,391,555 | B2 * | 3/2013 | Sakamoto .......... | G06K 9/00798 348/118 |

(Continued)

FOREIGN PATENT DOCUMENTS

EP    2696326 A1    2/2014
WO    2012169119 A1    12/2012

OTHER PUBLICATIONS

Office Action with a Search Report dated Oct. 19, 2016 issued over the corresponding Chinese Patent Application No. 201380067434.7 with the English translation of pertinent portion.

(Continued)

*Primary Examiner* — Neil Mikeska
(74) *Attorney, Agent, or Firm* — Carrier Blackman & Associates, P.C.; Joseph P. Carrier; Jeffrey T. Gedeon

(57) ABSTRACT

The present invention relates to a vehicle periphery monitoring device. An object identification unit comprises: a first identifier requiring a relatively low computation volume for an object identification process; and a second identifier requiring a relatively high computation volume for the object identification process. A region to be identified determination unit determines at least one region to be identified which is presented in the identification process by the second identifier, by carrying out a clustering process relating to location and/or scale, with respect to a plurality of region candidates which are extracted by the first identifier as wherein objects are present.

3 Claims, 10 Drawing Sheets

(51) Int. Cl.
 G08G 1/16 (2006.01)
 G06K 9/00 (2006.01)
(52) U.S. Cl.
 CPC .............. *G08G 1/166* (2013.01); *H04N 7/18* (2013.01); *G06T 2207/30261* (2013.01)

(56) References Cited

U.S. PATENT DOCUMENTS

| | | | | |
|---|---|---|---|---|
| 8,548,256 | B2* | 10/2013 | Loui | G06K 9/00677 |
| | | | | 382/159 |
| 9,367,756 | B2* | 6/2016 | Pillai | G06K 9/00288 |
| 2008/0040004 | A1* | 2/2008 | Breed | B60R 21/0134 |
| | | | | 701/45 |
| 2009/0033745 | A1* | 2/2009 | Yeredor | G01S 3/7864 |
| | | | | 348/152 |
| 2012/0242799 | A1* | 9/2012 | Saito | G01S 7/4802 |
| | | | | 348/46 |
| 2013/0070096 | A1* | 3/2013 | Muramatsu | G06K 9/78 |
| | | | | 348/148 |
| 2013/0223689 | A1* | 8/2013 | Saito | G06K 9/00791 |
| | | | | 382/104 |
| 2014/0204212 | A1* | 7/2014 | Pawlicki | G06T 7/73 |
| | | | | 348/148 |

OTHER PUBLICATIONS

Alonso et al., "Combination of Feature Extraction Methods for SVM Pedestrian Detection," IEEE on Intelligent Transportation Systems, Jun. 2007, pp. 292-307, vol. 8, No. 2.
Junfeng GE et al., "Real-Time Pedestrian Detection and Tracking at Nighttime for Driver-Assistance Systems", IEEE Transactions on Intelligent Transportation Systems, IEEE, Piscataway, NJ, USA, vol. 10, No. 2, Jun. 1, 2009, pp. 283-298, XP011347179, ISSN: 1524-9050, DOI: 10.1109/TITS.2009.2018961.
Rowley H A et al., "Neural Network-Based Face Detection", IEEE Transactions on Pattern Analysis and Machine Intelligence, IEEE Computer Society, USA, vol. 20, No. 1, Jan. 1, 1998, pp. 23-38, XP000753322, ISSN: 0162-8828, DOI: 10.1109/34.655647.
Meynet et al., "Face detection with boosted Gaussian features", Pattern Recognition, Elsevier, GB, vol. 40, No. 8, Apr. 17, 2007, pp. 2283-2291, XP022031751, ISSN: 0031-3203, DOI: 10.1016/J.PATCOG.2007.02.001.
Extended European Search Report dated Sep. 8, 2016 issued over the corresponding European Patent Application No. 13867122.7.
Baba et al., "Pedestrian Detection at Night", View 2008, Proceedings of the Vision Engineering Workshop, pp. 224-228.
The English translation of the International Search Report from the publication of PCT/JP2013073830.

\* cited by examiner

VEHICLE PERIPHERY MONITORING DEVICE

TECHNICAL FIELD

The present invention relates to a vehicle periphery monitoring device, which detects objects existing around the periphery of a vehicle, based on a captured image acquired from an imaging unit that is mounted on the vehicle.

BACKGROUND ART

Conventionally, for the purpose of supporting vehicle driving, a technique has been known for detecting objects that exist outside of a vehicle, or for monitoring a relative positional relationship between such objects and a driver's own vehicle. In particular, various methods have been proposed to capture images using a camera (image capturing unit) that is mounted on the front of a vehicle, and to detect objects based on the captured images obtained therefrom.

For example, in "Nighttime Pedestrian Detection", ViEW 2008, Proceedings of the Vision Engineering Workshop, pages 224-228, a technique is disclosed in which, after a number of area candidates have been extracted by performing a simple primary identification process, e.g., boosting, having a short computation time with respect to an entire captured image, a detailed secondary identification process, e.g., SVM (Support Vector Machine), having a long computation time is applied sequentially with respect to each of the area candidates.

SUMMARY OF INVENTION

Incidentally, although it is possible to capture the form of an object by performing the simple primary identification process, there is a tendency for it not to be possible to accurately detect the position of the object. More specifically, even for the same object, cases occur in which plural area candidates that differ slightly in position or the like are extracted. Therefore, concerning the secondary identification process, as a practical matter, it becomes necessary to carry out needless computations with respect to the same object, leading to a problem in that a sufficient effect of reducing the amount of computation cannot be obtained.

The present invention has been devised as a solution to the aforementioned problem, and has the object of providing a vehicle periphery monitoring device, which enables both a reduction in the amount of computation and an improvement in accuracy in relation to an object identification process.

A vehicle periphery monitoring device according to the present invention includes an image capturing unit mounted on a vehicle and configured to acquire a captured image around a periphery of the vehicle by performing image capturing while the vehicle is traveling, an identification target area determiner configured to determine identification target areas from within an image area in the captured image acquired by the image capturing unit, and an object identifier configured to identify whether or not an object exists within the identification target areas determined by the identification target area determiner. The object identifier includes a first identifying unit for which a computation amount thereof required by an identification process for identifying the object is relatively small, and a second identifying unit for which a computation amount thereof required by an identification process for identifying the object is relatively large. The identification target area determiner determines at least one of the identification target areas to be subjected to the identification process by the second identifying unit, by performing a clustering process in relation to position and/or scale with respect to plural area candidates extracted by the first identifying unit as areas in which the object exists.

As described above, the object identifier includes a first identifying unit for which a computation amount thereof required by an identification process for identifying the object is relatively small, and a second identifying unit for which a computation amount thereof is relatively large. In addition, the identification target area determiner determines at least one of the identification target areas to be subjected to the identification process by the second identifying unit, by performing the clustering process in relation to position and/or scale, with respect to plural area candidates extracted by the first identifying unit as areas in which the object exists. Consequently, with respect to identification target areas that have been suitably classified, the identification process can be executed by the second identifying unit for which the computation amount thereof is relatively large, whereby an improvement in accuracy and a reduction in the amount of computation in relation to the object identification process can both be achieved.

Further, preferably, the identification target area determiner may divide the image area into a plurality of sub-areas, and may determine the identification target areas by performing the clustering process in relation to position with respect to each of representative positions of the area candidates calculated in each of the sub-areas. By this feature, the data amount (total number of different positions) used for the clustering process can be reduced, so that the computation process can be realized at a faster speed.

The identification target area determiner preferably classifies the plural area candidates into two or more groups depending on scale, and determines the identification target areas, respectively, by performing the clustering process on each of the groups. In this manner, with respect to identification target areas that have been suitably classified by scale, the identification process is executed by the second identifying unit, whereby error factors due to variations in scale can be reduced, and identification accuracy can be further enhanced.

Furthermore, preferably, the identification target area determiner, after having classified the plural area candidates into at least one position group by performing a previous stage clustering process in relation to at least one position, may classify the area candidates belonging to the at least one position group into the two or more groups depending on scale, and then may determine the identification target areas, respectively. By using the first identifying unit for which the computation amount thereof is relatively small, there is a tendency to extract area candidates of similar scale at substantially the same position. Thus, by classifying the plural area candidates into at least one position group, it is possible to exclude beforehand the existence of area candidates which are similar in scale but are separated in position, whereby identification accuracy can be further enhanced.

According to the vehicle periphery monitoring device of the present invention, the object identifier includes a first identifying unit for which a computation amount thereof required by an identification process for identifying the object is relatively small, and a second identifying unit for which a computation amount thereof is relatively large. In addition, the identification target area determiner determines at least one of the identification target areas to be subjected to the identification process by the second identifying unit, by performing a clustering process in relation to position and/or scale, with respect to plural area candidates extracted by the first identifying unit as areas in which the object exists. Consequently, with respect to identification target areas that have been suitably classified, the identification process can be executed by the second identifying unit for which the computation amount thereof is relatively large, whereby an improvement in accuracy and a reduction in the amount of computation in relation to the object identification process can both be achieved.

DESCRIPTION OF EMBODIMENTS

A preferred embodiment of a vehicle periphery monitoring device according to the present invention will be described below with reference to the accompanying drawings.

[Configuration of Vehicle Periphery Monitoring Device 10]

Figure 1:
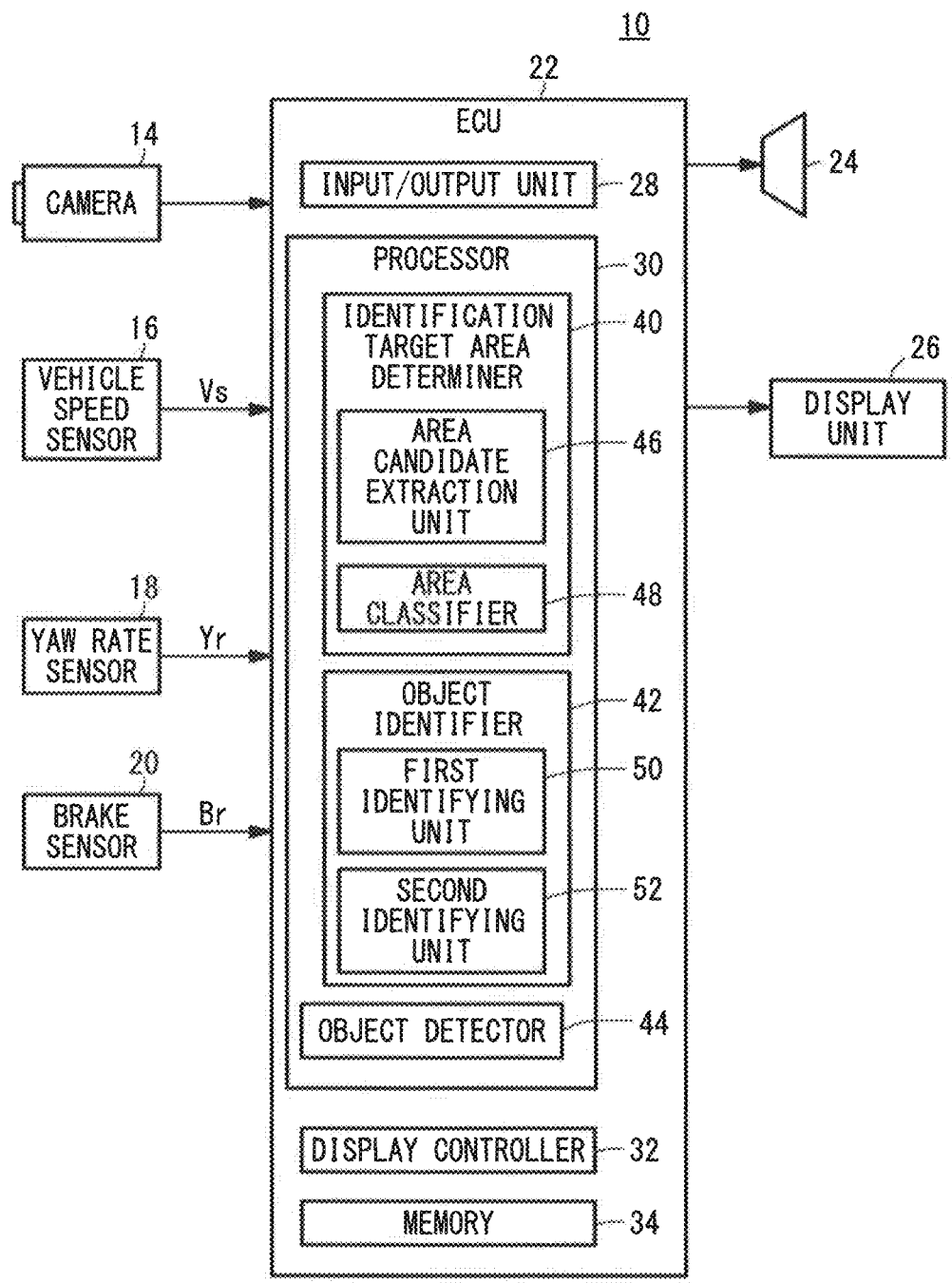
FIG. 1 is a block diagram showing a configuration of a vehicle periphery monitoring device according to an embodiment of the present invention.
Figure 2:
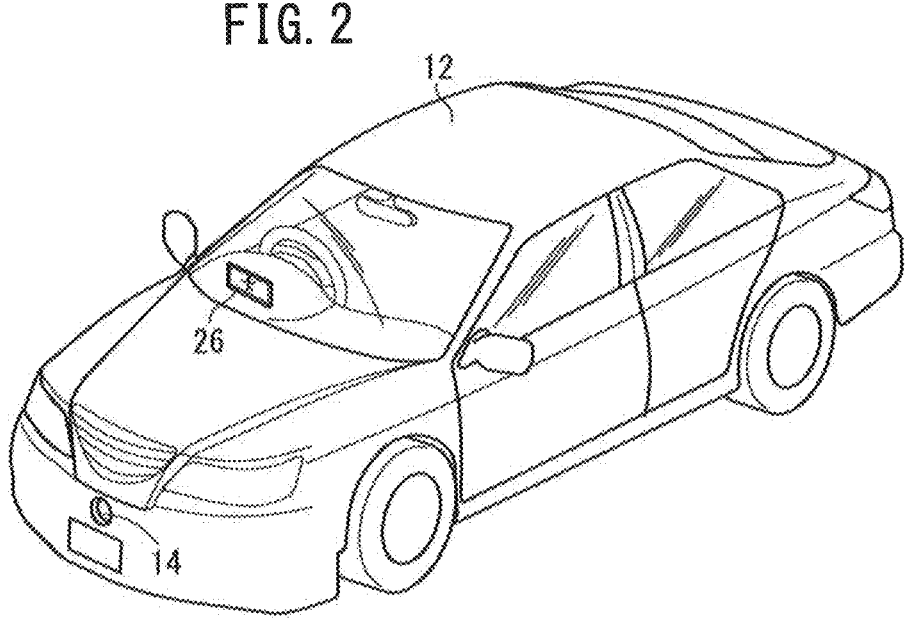
FIG. 2 is a schematic perspective view of a vehicle in which the vehicle periphery monitoring device shown in FIG. 1 is incorporated.

FIG. 1 is a block diagram showing a configuration of a vehicle periphery monitoring device 10 according to the present embodiment. FIG. 2 is a schematic perspective view of a vehicle 12 in which the vehicle periphery monitoring device 10 shown in FIG. 1 is incorporated.

As shown in FIGS. 1 and 2, the vehicle periphery monitoring device 10 is equipped with a color camera (hereinafter referred to as a "camera 14") that captures a color image (hereinafter referred to as an "image Im") made up from a plurality of color channels, a vehicle speed sensor 16 for detecting a velocity Vs of the vehicle 12, a yaw rate sensor 18 for detecting a yaw rate Yr of the vehicle 12, a brake sensor 20 for detecting an operating amount Br by which a brake pedal is operated by a driver, an electronic control unit (hereinafter referred to as an "ECU 22") that controls the vehicle periphery monitoring device 10, a speaker 24 for issuing an alarm or the like by voice, and a display unit 26 that displays a captured image that is output from the camera 14.

The camera 14 is a camera using light having wavelengths primarily in the visible range, and functions as an image capturing means (image capturing unit) for capturing an image of the periphery of the vehicle 12. The camera 14 has characteristics such that, the greater the amount of light reflected from the surface of a subject is, the higher the level of an output signal from the camera becomes, thereby resulting in an increase in brightness, e.g., RGB values, of the image. As shown in FIG. 2, the camera 14 is fixedly disposed (mounted) in a substantially central region of a front bumper of the vehicle 12.

The image capturing means for capturing an image around the periphery of the vehicle 12 is not limited to the above structure (a so-called monocular camera), but may be a multiocular camera (stereo camera). Further, instead of a color camera, the image capturing means may be a monochromatic camera or an infrared camera, or one or both of such cameras may be used in combination with a color camera. Moreover, if the image capturing means is a monocular camera, then the monocular camera may be combined with a range finding means (radar apparatus).

Referring back to FIG. 1, the speaker 24 produces a warning sound or the like on the basis of a command from the ECU 22. The speaker 24 is mounted on a non-illustrated dashboard of the vehicle 12. Alternatively, a speech output function, which belongs to another apparatus (e.g., an audio system or a navigation system), may be used as the speaker 24.

The display unit 26 (see FIGS. 1 and 2) is a head-up display (HUD), which is positioned such that a display screen thereof is displayed on the front windshield of the vehicle 12, at a position where the display screen does not obstruct the forward vision of the driver. The display unit 26 is not limited to a HUD, but may be a display unit for displaying a map, etc., of a navigation system incorporated in the vehicle 12, or a display unit (multi-information display unit: MID) disposed in a meter unit for displaying mileage information, etc.

The ECU 22 basically includes an input/output unit 28, a processor 30, a display controller 32, and a memory 34.

Signals from the camera 14, the vehicle speed sensor 16, the yaw rate sensor 18, and the brake sensor 20 are input to the ECU 22 through the input/output unit 28. Further, signals from the ECU 22 are output through the input/output unit 28 to the speaker 24 and the display unit 26. The input/output unit 28 includes a non-illustrated A/D conversion circuit for converting input analog signals into digital signals.

The processor 30 performs processing sequences on the signals from the camera 14, the vehicle speed sensor 16, the yaw rate sensor 18, and the brake sensor 20, and on the basis of results of the processing operations, generates signals that are supplied to the speaker 24 and the display unit 26. The processor 30 functions as an identification target area determiner 40 (identification target area determining means), an object identifier 42 (object identifying means), and an object detector 44.

The various functions of the components of the processor 30 are realized by reading and executing programs stored in the memory 34. Alternatively, the programs may be supplied from an external source via a non-illustrated wireless communications unit (mobile phone, smartphone, or the like).

The display controller 32 is a control circuit for energizing and controlling the display unit 26. By supplying a display control signal to the display unit 26 through the input/output unit 28, the display controller 32 energizes the display unit 26. Accordingly, the display unit 26 is capable of displaying various types of images (the captured image Im, marks, etc.).

The memory 34 is composed of a random access memory (RAM) for storing captured image signals that have been converted into digital signals, temporary data used in various processing operations, etc., and a read only memory (ROM) for storing executable programs, tables and maps, etc.

The vehicle periphery monitoring device 10 according to the present embodiment is basically configured as described above. An outline of operations of the vehicle periphery monitoring device 10 will be described below.

The ECU 22 converts an analog video signal output from the camera 14 into a digital signal, and temporarily stores the digital signal in the memory 34, at prescribed frame clock interval or period (e.g., at thirty frames per second).

The ECU 22 then performs various processing operations on the captured image Im (i.e., an image in front of the vehicle 12) which is read from the memory 34. The ECU 22, and in particular the processor 30, comprehensively evaluates the results of the processing sequences carried out on the captured image Im. Further, if necessary, the ECU 22 comprehensively evaluates respective signals (the vehicle speed Vs, the yaw rate Yr, and the operating amount Br) which indicate the traveling state of the vehicle 12. Then, the ECU 22 detects a human body, an animal, or the like that exists in front of the vehicle 12 as an object to be monitored (hereinafter referred to as a "monitoring object" or simply an "object").

If the processor 30 assesses that there is a high possibility for the vehicle 12 to come into contact with the monitoring object, the ECU 22 controls each of the output units of the vehicle periphery monitoring device 10 in order to call the attention of the driver. For example, the ECU 22 controls the speaker 24 to output a warning sound, e.g., a succession of blips, and highlights the monitoring object in the captured image Im, which is displayed visually on the display unit 26.

[Detailed Operations of Vehicle Periphery Monitoring Device 10]

Figure 3:
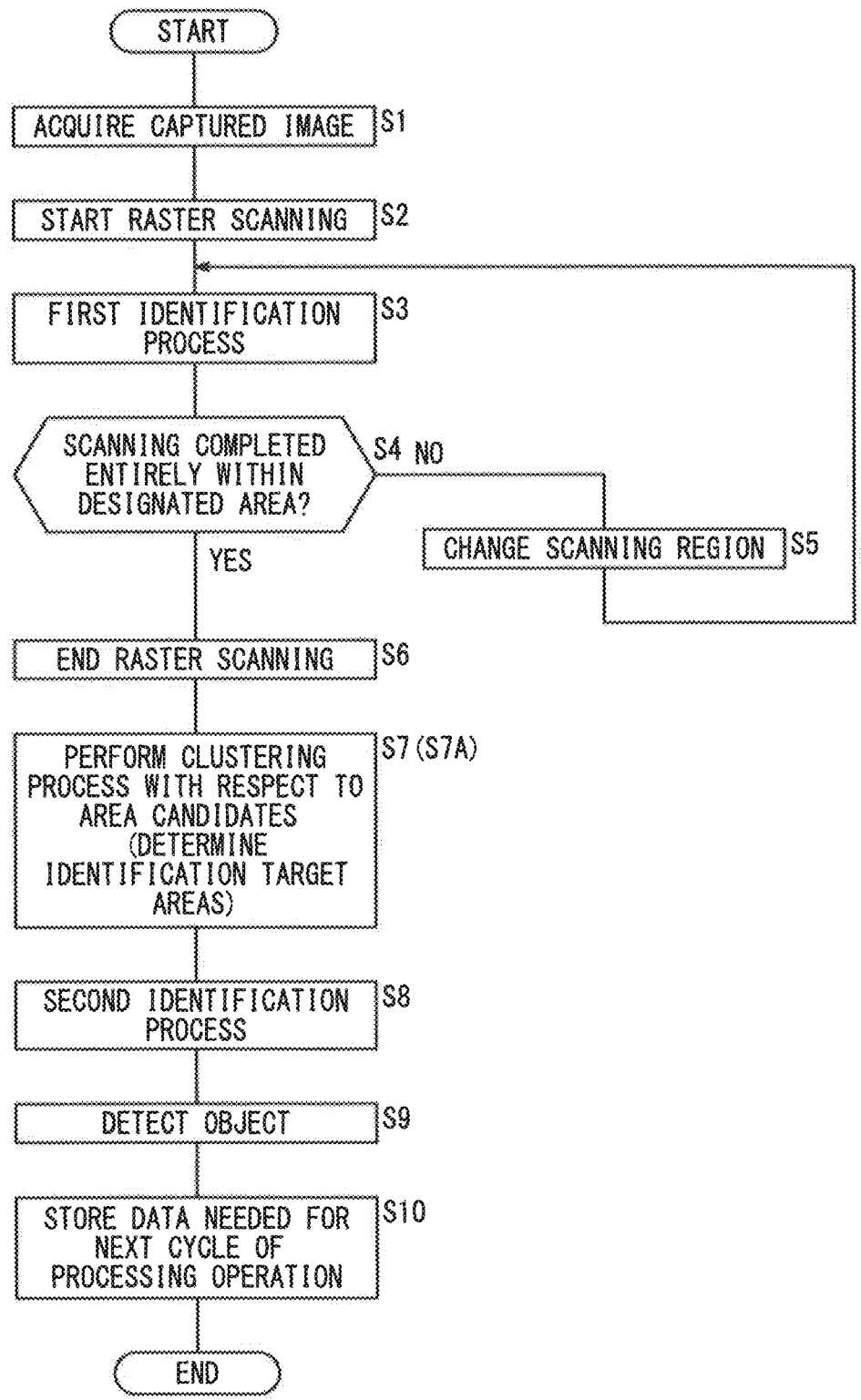
FIG. 3 is a flowchart used for describing operations of an ECU shown in FIG. 1.

Next, operations of the vehicle periphery monitoring device 10 will be described below with reference to the flowchart shown in FIG. 3. The sequence of operations or process flow is carried out for each of respective captured frames while the vehicle 12 is traveling.

In step S1, for each frame, the ECU 22 acquires a captured image Im of an area that lies within a given angle of view in front of the vehicle 12, which is represented by an output signal from the camera 14.

Figure 4A:
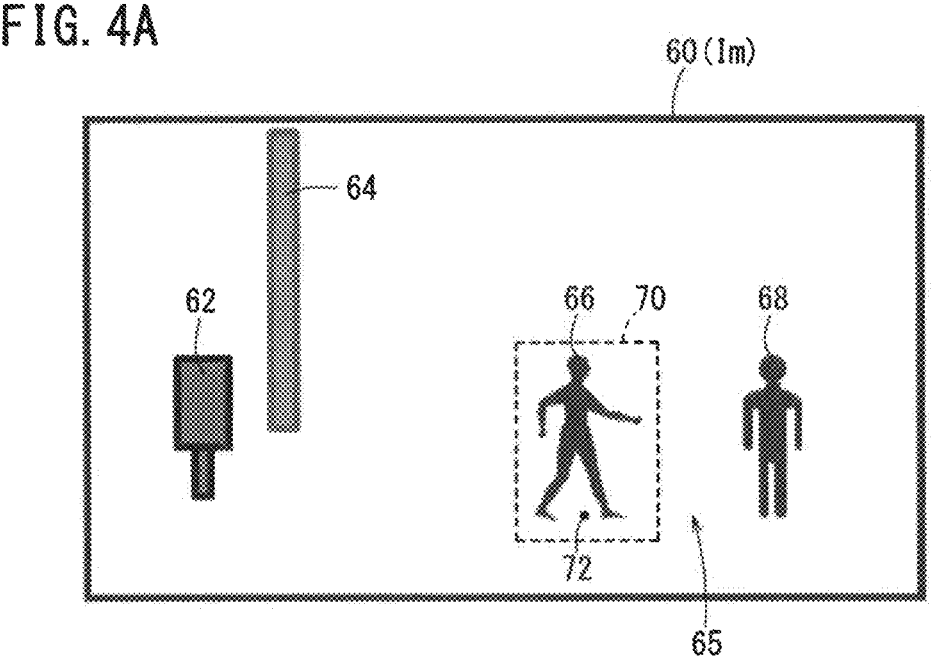
FIG. 4A is a display image showing an example of a captured image acquired by way of image capturing using a camera.

As shown in FIG. 4A, it is assumed that the ECU 22 acquires a captured image Im in one frame at a given time from the camera 14. The captured image Im represents an image area 60 having a horizontally elongate rectangular shape made up of horizontal rows of 1200 pixels and vertical columns of 600 pixels, for example. Within the image area 60, there exist, starting from the left, an image region of a postal submission box (hereinafter referred to simply as a "post box 62"), an image region of a utility pole (hereinafter referred to simply as a "utility pole 64"), an image region of a road surface (hereinafter referred to simply as a "road surface 65"), an image region of a first pedestrian (hereinafter referred to simply as a "first pedestrian 66"), and an image region of a second pedestrian (hereinafter referred to simply as a "second pedestrian 68").

In step S2, the processor 30 initiates a raster scanning process on the captured image Im. The raster scanning process refers to a process for sequentially identifying whether or not objects exist in the captured image Im, while a scanning region 70 in the captured image Im is moved along a prescribed scanning direction. The scanning region 70 corresponds to a region of interest for identifying whether or not an object including the first pedestrian 66 exists, as well as for identifying the type of object.

Thereafter, the identification target area determiner 40 sequentially determines the position and scale (size) of the currently specified scanning region 70. In the example shown in FIG. 4A, a rectangular scanning region 70 (the area framed by the dashed line) is set to include substantially the entirety of the first pedestrian 66. In addition, the position of the scanning region 70 can be specified by a position (hereinafter referred to as a "contact position 72") corresponding to a point of contact between an actual road surface and the first pedestrian.

In step S3, the object identifier 42 (first identifying unit 50) identifies whether at least one type of object exists within the determined scanning region 70 or not. The term "first identification process" as used herein implies an identification process for which an amount of computation needed by the process to identify an object is relatively small, and will hereinafter be described in detail. In addition, in the case that an object is identified as existing, an area candidate extraction unit 46 extracts the scanning region 70 as an area candidate 74 (refer to FIG. 4B).

In step S4, the identification target area determiner 40 assesses whether or not the scanning process has been completed entirely within the designated area. If the identification target area determiner 40 assesses that the scanning process has not been completed (step S4: NO), then control proceeds to the next step (step S5). The designated area, which is the object that is scanned, may be the entire image area 60 or a portion of the area.

In step S5, the identification target area determiner 40 changes the position or scale of the scanning region 70. More specifically, the identification target area determiner 40 moves the current scanning region 70 to a position where scanning has not yet been performed, and more specifically, moves the current scanning region by a predetermined amount (e.g., by one pixel) in a predetermined scanning direction (e.g., a rightward direction).

Thereafter, control returns to step S3, and the processor 30 repeats steps S3 through S5 until the scanning process has been completed within all of the designated areas. If it is judged that the scanning process is completed (step S4: YES), then in step S6, the processor 30 terminates the raster scanning process on the captured image Im.

Figure 4B:
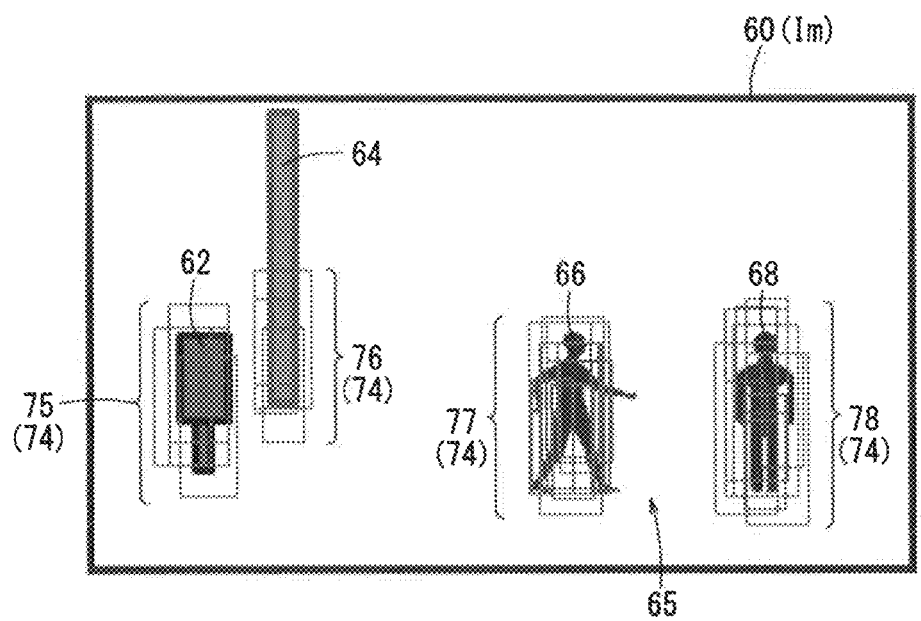
FIG. 4B is a display image showing extracted results of area candidates by a first identification process.

As shown in FIG. 4B, it is assumed that from within the image area 60, plural area candidates 74 are extracted. In this regard, an area candidate group 75 is an aggregate of area candidates 74 including at least a portion of the post box 62. Further, an area candidate group 76 is an aggregate of area candidates 74 including at least a portion of the utility pole 64. Furthermore, an area candidate group 77 is an aggregate of area candidates 74 including at least a portion of the first pedestrian 66. Furthermore, an area candidate group 78 is an aggregate of area candidates 74 including at least a portion of the second pedestrian 68.

In addition to human bodies (e.g., the first pedestrian 66 shown in FIG. 4A), examples of types of objects that can be identified may include various animals (specifically, mammals such as deer, horses, sheep, dogs, cats, etc., birds, etc.) and artificial structures (specifically, vehicles, markings, utility poles, guardrails, walls, etc.). In the present embodiment, the object identifier 42 serves to detect a living body (a human body or an animal). In this case, by way of the first identification process, the first pedestrian 66 and the second pedestrian 68 are properly identified, whereas the post box 62 and the utility pole 64, which are artificial structures, are mistakenly identified.

Further, although it is possible for the object identifier 42 to capture the form of an object by performing the simple first identification process, there is a tendency for it not to be possible to accurately detect the position of the object. More specifically, even for the same object, cases may occur in which plural area candidates 74 that differ slightly in position or the like are extracted. In greater detail, as shown in FIG. 4B, in the vicinity of one post box 62, plural area candidates 74, which differ in position or scale, are extracted, and the area candidate group 75 is formed thereby.

Figure 6A:
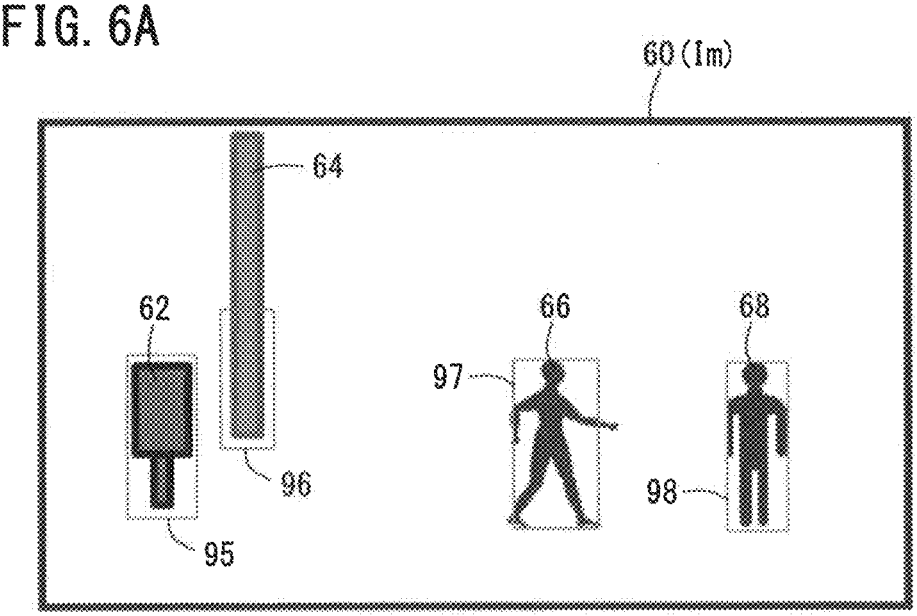
FIG. 6A is a display image showing a determination result of identification target areas by a second identification process.

In step S7, an area classifier 48 performs a clustering process with respect to each of the area candidates 74 that were extracted in step S3, thereby determining at least one of identification target areas 95 to 98 (see FIG. 6A). In this regard, the clustering process is defined by a process in which data sets are classified and divided into subsets (clusters), and is broadly divided into a hierarchical technique by which classification of data is done hierarchically, and a non-hierarchical technique in which the classification is done according to a particular evaluation function.

For example, using a mean shift method or a K-means clustering method, which are known non-hierarchical techniques, the area classifier 48 performs the clustering process in terms of the position and/or scale of the plural area candidates 74. However, according to such techniques, the amount of computation increases substantially in proportion to the square of the number of data, and therefore, as the total number of area candidates 74 increases, significantly more computing time is required for this process. Thus, the identification target area determiner 40 (area classifier 48) divides the image area 60 into a plurality of sub-areas 80, and the clustering process in relation to position is performed with respect to each of representative positions of the area candidates 74 that are calculated in the respective sub-areas 80.

Figure 5A:
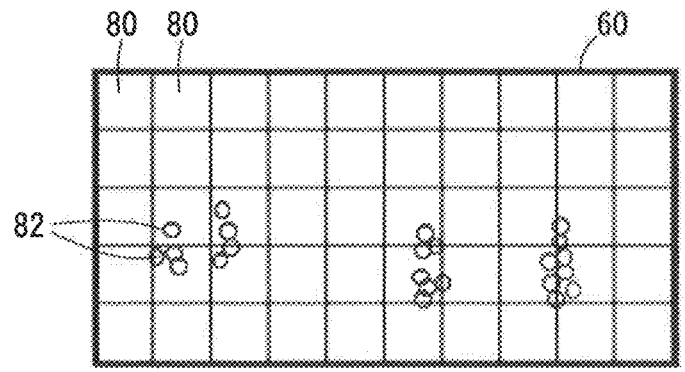
FIGS. 5A through 5C are schematic explanatory views showing a detailed method of a clustering process in relation to position.

As shown in FIG. 5A, the image area 60 is divided into a grid pattern, thereby defining a plurality of respective sub-areas 80. In FIG. 5A, the rectangular image area 60 is divided into a two-dimensional pattern made up of five rows and ten columns of equal blocks. Further, as shown in the figure, candidate positions 82, which specify the respective positions of the plural area candidates 74, are plotted on the image area 60. The candidate positions 82, which are indicated by circles, correspond to the respective contact positions 72 of the area candidates 74, for example.

Figure 5B:
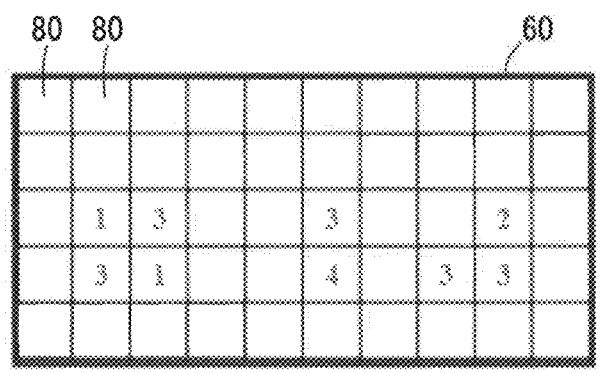

As shown in FIG. 5B, a representative position is determined for each of the previously divided sub-areas 80. For example, in the case that three candidate positions 82 exist within one of the sub-areas 80, a statistical value (average value) therefor is calculated, and the statistical value is stored as the representative position in the one sub-area 80 together with the number of (three) candidate positions 82. In addition, using a mean shift method, a maximum of fifty representative positions in the sub-areas 80 are classified in at least one group. When this calculation is made, evaluation values are weighted, respectively, corresponding to the number of candidate positions 82, i.e., depending on the numbers that are indicated in the rectangular cells of FIG. 5B. By this feature, the data amount (total number of different positions) used for the clustering process can be reduced, so that the computation process can be realized at a faster speed.

Figure 5C:
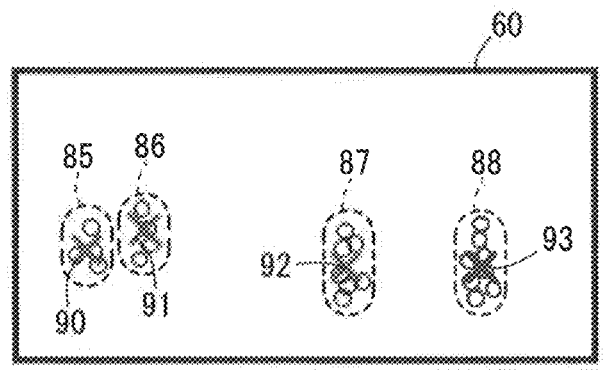

As results of the clustering process, as shown in FIG. 5C, candidate position groups 85, 86, 87, 88 are extracted, respectively, corresponding to the four area candidate groups 75 to 78 (see FIG. 4B). In addition, reference positions 90, 91, 92, 93 are determined, respectively, corresponding to the candidate position groups 85 to 88.

In this manner, as shown in FIG. 6A, in the image area 60, the identification target area determiner 40 (area classifier 48) determines four identification target areas 95, 96, 97, 98 specified from the reference positions 90 to 93. Further, in relation to FIGS. 5A through 5C, although a description has been given centering on a clustering process in relation to the (horizontal and vertical) positions of the plural area candidates 74, a clustering process in relation to scale may also be applied independently or in addition thereto. Moreover, the space coordinate system to which the clustering process is applied may be a three-dimensional space (real space) or a two-dimensional space (e.g., the captured image surface).

In step S8, the object identifier 42 (second identifying unit 52) identifies whether or not at least one type of object exists within the identification target areas 95 to 98 that were determined in step S7. The term "second identification process" as used herein implies an identification process for which an amount of computation needed by the process to identify an object is relatively large. Below, differences between the first and second identification processes will be explained.

The first identification process (step S3) is a simple process having a relatively short computing time, which enables the form of objects to be detected. On the other hand, the second identification process (step S8) is a detailed process having a relatively long computing time, which enables the form and position of objects to be detected. The amount of computation is relatively large (the computing time is relatively long) due to factors such as, for example, [1] the target area on which computation is effected is large, [2] the image resolution is high, [3] the calculation method for the image feature quantities is complex, [4] there are many types of image feature quantities, [5] identification of the types of objects is further performed, [6] the method encompasses the entire content of the first recognition process, or [7] the amount of memory used is large, etc.

The first identifying unit 50 (or the second identifying unit 52), for example, is an identifying device, which is generated using a machine learning process, with an image feature quantity in the scanning region 70 (or the identification target areas 95 to 98) being input thereto, and information as to whether or not an object exists being output therefrom. The machine learning process may be based on any of various algorithms, including a supervised learning algorithm, an unsupervised learning algorithm, and a reinforcement learning process. Examples of learning architecture may include a boosting process including AdaBoost, a support vector machine (SVM), a neural network, and an expectation maximization (EM) algorithm.

Figure 6B:
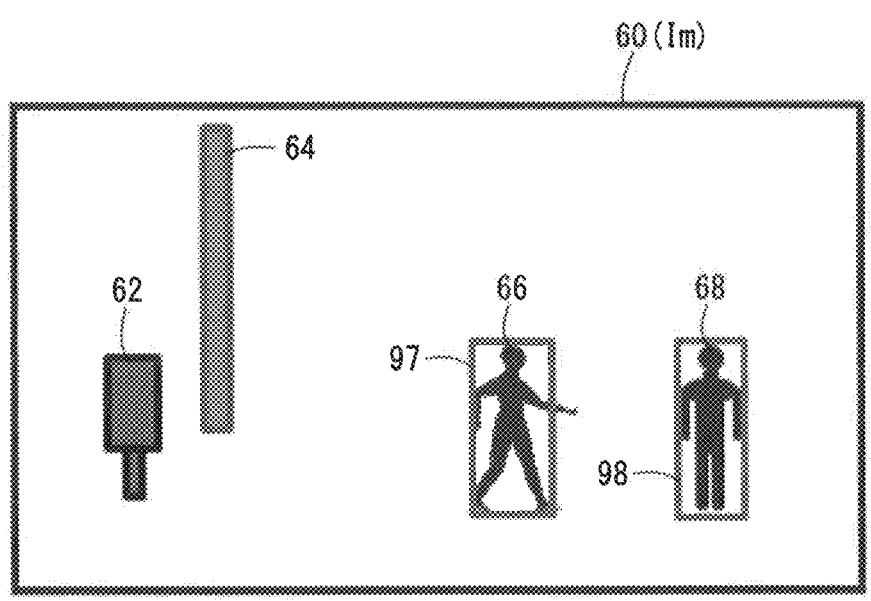
FIG. 6B is a display image showing a detection result of monitored objects.

As shown in FIG. 6B, the object identifier 42 (second identifying unit 52) excludes the post box 62 and the utility pole 64, which are artificial structures, and identifies each of the first pedestrian 66 and the second pedestrian 68. In this manner, the object identifier 42 may perform the second identification process with respect to the identification target areas 95 to 98 that have been suitably classified, so that, compared to the case of regarding all of the area candidates 74 (see FIG. 4B) as targets to be processed, the amount of computation can be significantly reduced.

In step S9, the object detector 44 detects objects that exist within the captured image Im, and in particular, detects the first pedestrian 66 and the second pedestrian 68 that were identified in step S8. The object detector 44 may use an identification result in a single frame, or may take into account identification results in a plurality of frames, so that a motion vector of one object can be calculated.

In step S10, the ECU 22 stores in the memory 34 data that are needed for the next cycle of processing operations. For example, the data may include attributes of the objects (the first pedestrian 66 and the second pedestrian 68 in FIG. 4A) that were obtained in step S9, the positions of the identification target areas 97, 98, or the like.

By successively carrying out the above operation sequence, the vehicle periphery monitoring device 10 is capable of monitoring objects that exist in front of the vehicle 12 at prescribed time intervals.

As described above, the object identifier 42 includes the first identifying unit 50 for which the computation amount thereof required by the identification process for identifying objects is relatively small, and the second identifying unit 52 for which the computation amount thereof is relatively large. In addition, the identification target area determiner 40 determines at least one of the identification target areas 95 to 98 to be subjected to the identification process by the second identifying unit 52, by performing the clustering process in relation to position and/or scale, with respect to plural area candidates 74 extracted by the first identifying unit 50 as areas in which objects exist. Consequently, with respect to the identification target areas 95 to 98 that have been suitably classified, the identification process can be executed by the second identifying unit 52 for which the computation amount thereof is relatively large, whereby an improvement in accuracy and a reduction in the amount of computation in relation to the object identification process can both be achieved.

[Improvements in the Clustering Process]

Next, examples of improvements in the clustering process (step S7 of FIG. 3) according to the present embodiment will be described.

Figure 7A:
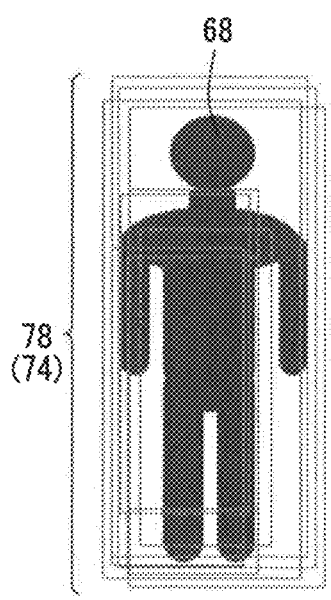
FIGS. 7A and 7B are schematic explanatory views showing examples of results of a clustering process.
Figure 7B:
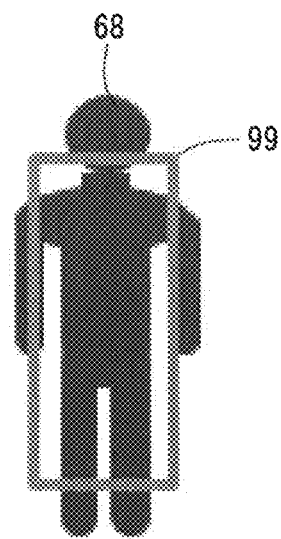

As shown in FIG. 7A, with respect to the same object (second pedestrian 68), an area candidate group 78 is extracted in which scales of multiple levels are mixed. In this case, as a result of carrying out the clustering process simultaneously with respect to the horizontal direction, the vertical direction, and the scale direction, an identification target area 99 is set having a scale of an intermediate value within the aforementioned multiple levels (see FIG. 7B). Stated otherwise, by handling the multiple level scales without distinction, cases occur in which an identification target area having an appropriate scale cannot be set. Thus, the area classifier 48 may classify the plural area candidates 74 into two or more groups depending on scale, and then perform the clustering process on each of such groups. In this manner, the second identification process is executed with respect to the identification target areas 105, etc. (see FIG. 9), that have been suitably classified by scale, whereby error factors due to variations in scale can be reduced, and identification accuracy can be further enhanced.

<First Improvement>

Figure 8:
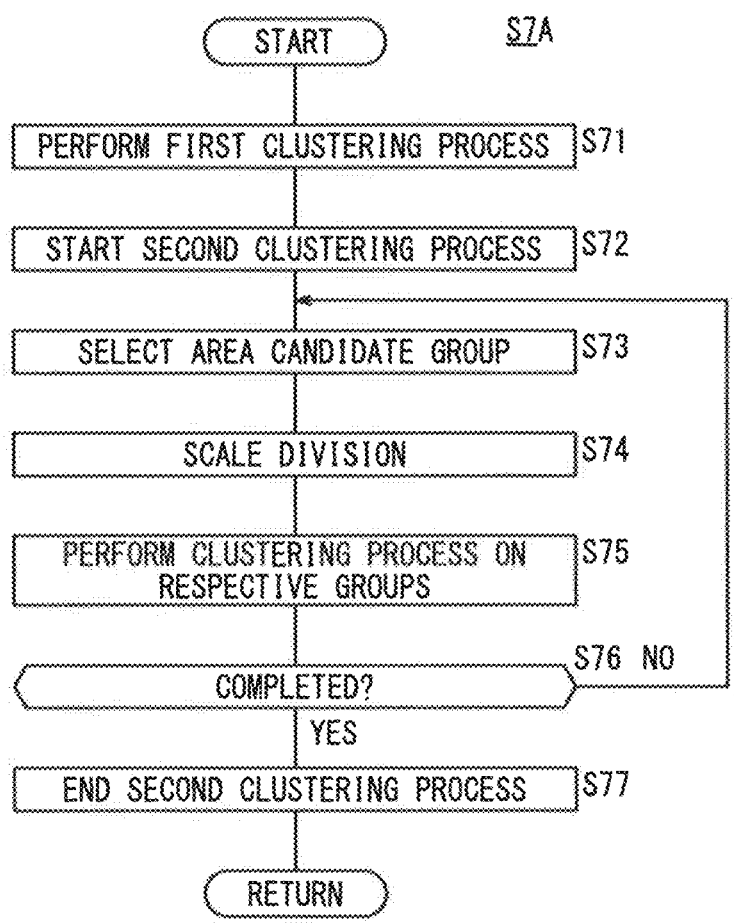
FIG. 8 is a flowchart used for describing a clustering process according to a first improvement.

First, a clustering process (step S7A of FIG. 3) according to a first improvement will be described with reference to FIGS. 8 and 9. FIG. 8 is a flowchart used for describing a clustering process according to the first improvement.

In step S71, the area classifier 48 performs a clustering process (hereinafter referred to as a first clustering process) in relation at least to position, thereby classifying each of the area candidates 74 into at least one position group. As a result, it is assumed that the respective area candidates 74 are classified into an area candidate group 78 (see FIG. 7A), which is one position group.

In step S72, based on the classification result of step S71, the area classifier 48 initiates a secondary clustering process. Below, the secondary clustering process will be explained.

The area classifier 48 selects one position group that has not yet been selected, i.e., one area candidate group 78 (step S73), and thereafter carries out a scale division of each of the area candidates 74 that belong to the position group (step S74).

Figure 9:
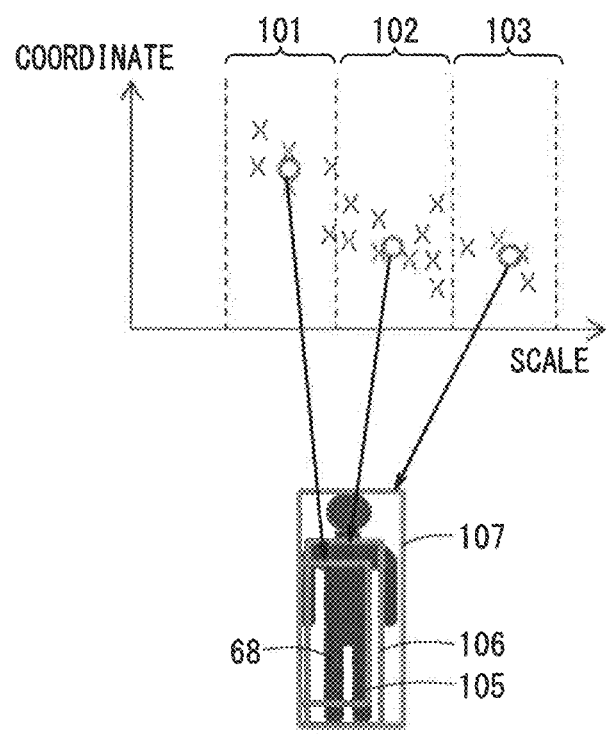
FIG. 9 is a schematic explanatory view showing a detailed method of a scale division process performed in step S74 of FIG. 8.

As shown in FIG. 9, the area classifier 48 classifies plots of multidimensional coordinates, which are defined by a scale on the horizontal axis and coordinates (positions) on the vertical axis, into two or more levels depending on scale. As a result, the respective area candidates 74 are classified into, for example, three groups 101, 102, and 103.

Thereafter, in step S75, the area classifier 48 executes the clustering process in relation to position and/or scale for each of the groups that were classified in step S73. The clustering process can be executed in the same manner as in step S7, and thus explanations thereof are omitted.

Next, the area classifier 48 returns to step S73 (step S76: NO), and thereafter, steps S73 through S75 are repeated sequentially. Additionally, in the case that all of the position groups (area candidate groups 78) have been selected and the clustering process thereon is completed (step S76: YES), then in step S77, the secondary clustering process is brought to an end.

As a result, the area classifier 48 determines the identification target areas 105, 106, 107 respectively for the groups 101 to 103 that were classified by the clustering process. With respect to the same second pedestrian 68, the area classifier 48 is capable of determining, respectively, an identification target area 105 of a small scale, an identification target area 106 of an intermediate scale, and an identification target area 107 of a large scale.

In this manner, the identification target area determiner 40, after having classified the plural area candidates 74 into at least one position group by performing the previous stage clustering process in relation to at least position, classifies the area candidates 74 belonging to the at least one position group into two or more groups depending on scale, and then determines the identification target areas 105 to 107 for the respective area candidates.

By using the first identifying unit 50 for which the computation amount thereof is relatively small, there is a tendency to extract area candidates 74 of similar scale at substantially the same position. Thus, by classifying the plural area candidates 74 into at least one position group, it is possible to exclude beforehand the existence of area candidates 74 which are similar in scale but are separated in position, whereby identification accuracy can be further enhanced.

<Second Improvement>

Next, a second improvement will be described with reference to FIG. 10.

Figure 10:
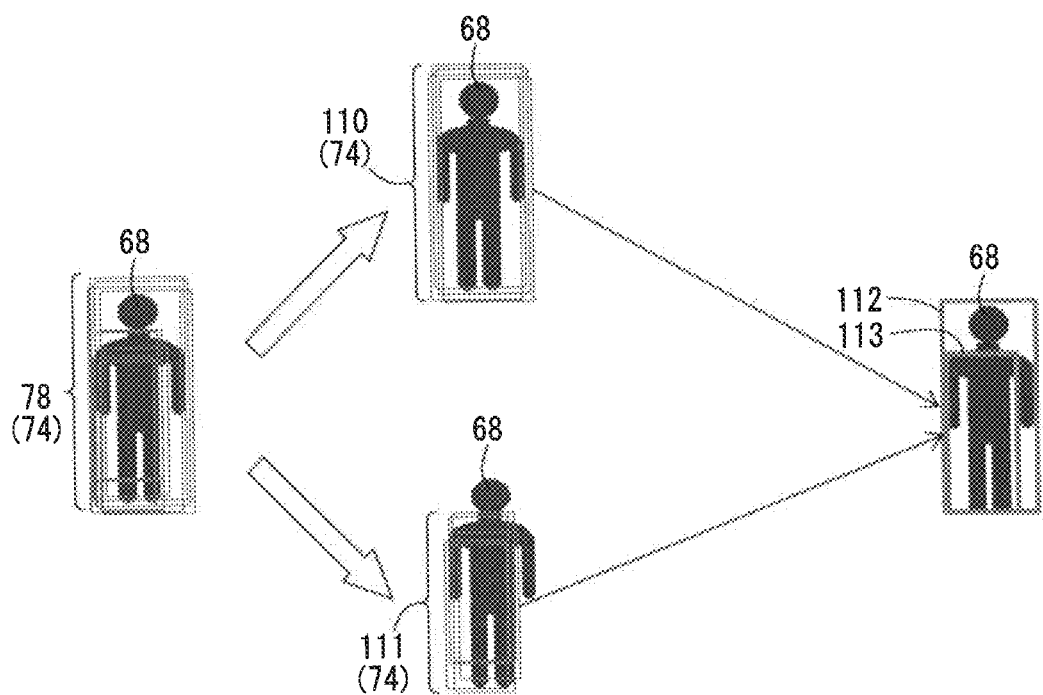
FIG. 10 is a schematic explanatory view showing a detailed method of a clustering process according to a second improvement.

As shown in FIG. 10, the area classifier 48 classifies the plural area candidates 74 into two or more groups depending on scale. In FIG. 10, the plural area candidates 74 are classified into an area candidate group 110, which is an aggregate of the area candidates 74 having a scale that is greater than a predetermined threshold value, and an area candidate group 111, which is an aggregate of the area candidates 74 having a scale that is equal to or less than the predetermined threshold value. Thereafter, the area classifier

48 determines identification target areas 112, 113 by performing the clustering process on each of the groups. More specifically, with respect to the same second pedestrian 68, the area classifier 48 is capable of determining, respectively, an identification target area 113 of a small scale, and an identification target area 112 of a large scale.

In this manner, according to the second improvement, the clustering process may be performed only on the number of classified groups, whereby identification accuracy can be enhanced together with realizing a reduction in the amount of computation.

[Supplementary Features]

The present invention is not limited to the embodiment described above. The embodiment may be changed or modified without departing from the scope of the present invention.

For example, in the present embodiment, the aforementioned image processing sequence is carried out on the captured image Im, which is produced by the monocular camera (camera 14). However, the same advantages as those described above can be obtained by performing the image processing sequence on a captured image that is produced by a multiocular camera (stereo camera).

The invention claimed is:

1. A vehicle periphery monitoring device comprising:
   an image capturing unit mounted on a vehicle and configured to acquire a captured image around a periphery of the vehicle by performing image capturing while the vehicle is traveling;
   an identification target area determiner configured to determine identification target areas from within an image area in the captured image acquired by the image capturing unit; and
   an object identifier configured to identify whether or not an object exists within the identification target areas determined by the identification target area determiner, wherein:
   the object identifier includes a first identifying unit for which a computation amount thereof required by an identification process for identifying the object is relatively small, and a second identifying unit for which a computation amount thereof required by an identification process for identifying the object is relatively large; and
   the identification target area determiner determines at least one of the identification target areas to be subjected to the identification process by the second identifying unit, by performing a clustering process in relation to position and/or scale with respect to plural area candidates extracted by the first identifying unit as areas in which the object exists,
   wherein the identification target area determiner divides the image area into a plurality of sub-areas, and determines the identification target areas by performing the clustering process in relation to position with respect to each of representative positions of the area candidates calculated in each of the sub-areas.

2. The vehicle periphery monitoring device according to claim 1, wherein the identification target area determiner classifies the plural area candidates into two or more groups depending on scale, and determines the identification target areas, respectively, by performing the clustering process on each of the groups.

3. The vehicle periphery monitoring device according to claim 2, wherein the identification target area determiner, after having classified the plural area candidates into at least one position group by performing a previous stage clustering process in relation to at least position, classifies the area candidates belonging to the at least one position group into the two or more groups depending on scale, and then determines the identification target areas, respectively.

* * * * *